United States Patent [19]

Eisel et al.

[11] Patent Number: 5,412,681
[45] Date of Patent: May 2, 1995

[54] SLAB-WAVEGUIDE $CO_2$ LASER

[75] Inventors: Dietmar Eisel, Pleasanton, Calif.;
 Herbert Gross, Aalen, Germany;
 Christopher L. Pertersen, Danville, Calif.

[73] Assignee: Carl Zeiss, Inc., N.Y.

[21] Appl. No.: 219,844

[22] Filed: Mar. 30, 1994

[51] Int. Cl.$^6$ .............................. H01S 3/03
[52] U.S. Cl. ...................... 372/64; 372/95; 372/19; 372/23; 372/99
[58] Field of Search .............. 372/95, 19, 23, 99, 372/64, 92, 98

[56] References Cited

U.S. PATENT DOCUMENTS

| | | | |
|---|---|---|---|
| 4,719,639 | 1/1988 | Tulip | 372/66 |
| 4,939,738 | 7/1990 | Opower | 372/64 |
| 5,048,048 | 9/1991 | Nishimae et al. | 372/95 |
| 5,050,181 | 9/1991 | Gekat | 372/64 |
| 5,058,122 | 10/1991 | Gekat | 372/95 |
| 5,123,028 | 6/1992 | Hobart et al. | 372/95 |
| 5,131,003 | 7/1992 | Mefferd | 372/65 |
| 5,131,004 | 7/1992 | Dallarosa et al. | 372/86 |
| 5,140,606 | 8/1992 | Yarborough et al. | 372/64 |
| 5,148,438 | 9/1992 | Remo et al. | 372/37 |
| 5,155,739 | 10/1992 | Mefferd . | |
| 5,216,689 | 6/1993 | Gardner et al. | 372/64 |
| 5,278,859 | 1/1994 | Arndt | 372/64 |
| 5,283,797 | 2/1994 | Mefferd | 372/64 |
| 5,327,446 | 7/1994 | Waynant | 372/64 |

OTHER PUBLICATIONS

"Infrared Optical Properties of Water and Ice Spheres", W. M. Irvine and J. B. Pollack, Icarus, 8, 1968, pp. 324–360.

"Coupling Losses in Hollow Waveguide Laser Resonators", R. L. Abrams, IEEE Journal of Quantum Elec. QE–8, No. 11, Nov. 1972, pp. 838–843.

"Resonator Theory for Hollow Waveguide Lasers", R. L. Abrams and A. N. Chester, Applied Optics, vol. 13, No. 9, Sep. 1974, pp. 2117–2125.

Primary Examiner—Lëon Scott, Jr.
Attorney, Agent, or Firm—Michael B. Einschlag

[57] ABSTRACT

An improved slab-waveguide $CO_2$ laser which includes two parallel, rectangular, flat, spaced-apart, slab electrodes whose surfaces excite a laser gas and guide laser light in a plane perpendicular to the surfaces of the slab electrodes. The component of the light propagating parallel to the electrode surfaces is not guided and is acted on only by resonator mirrors which form an unstable resonator. The improved slab-waveguide $CO_2$ laser operates on a single vibrational transition of the $CO_2$ molecule by employing wavelength selective optics.

9 Claims, 10 Drawing Sheets

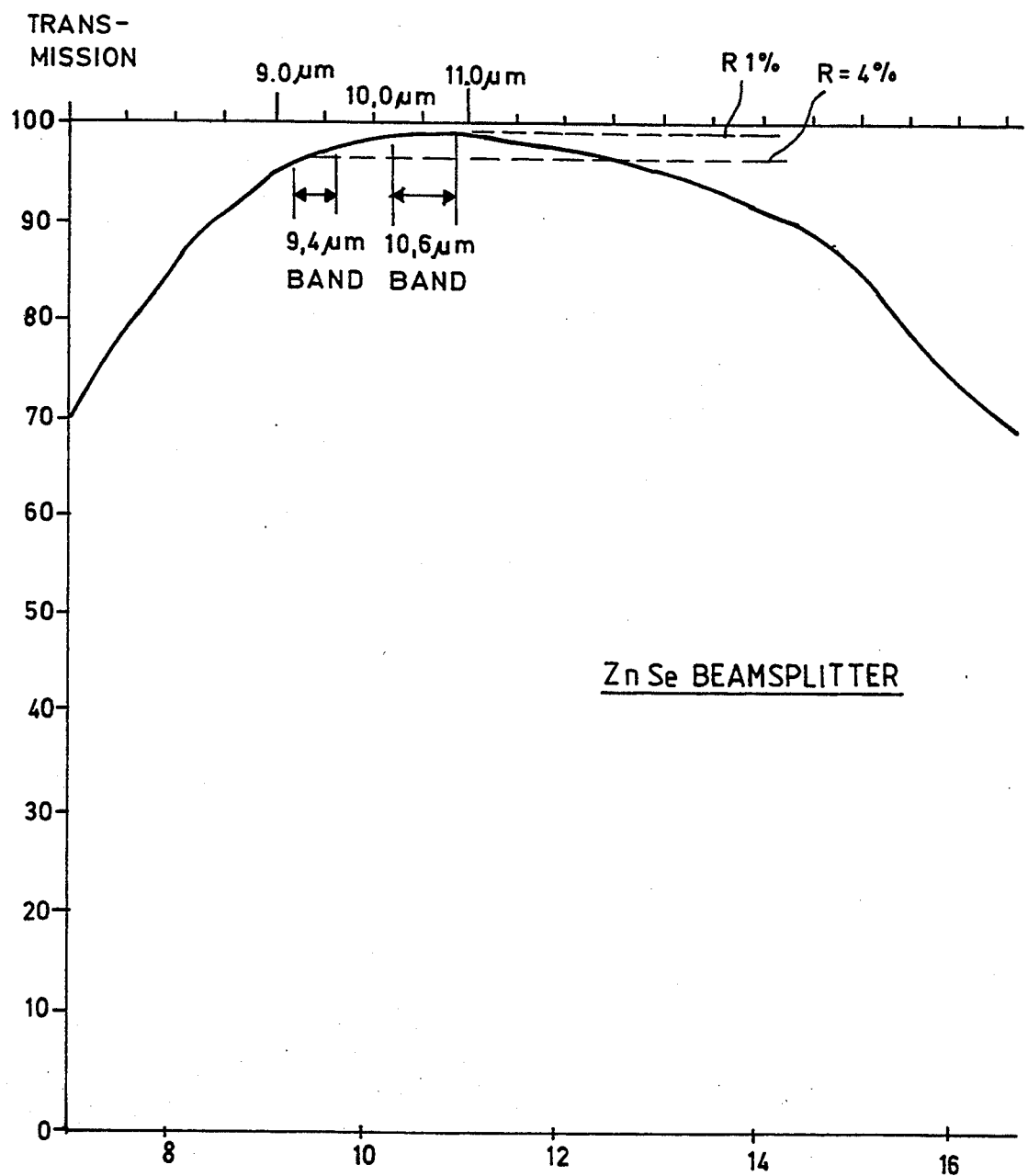

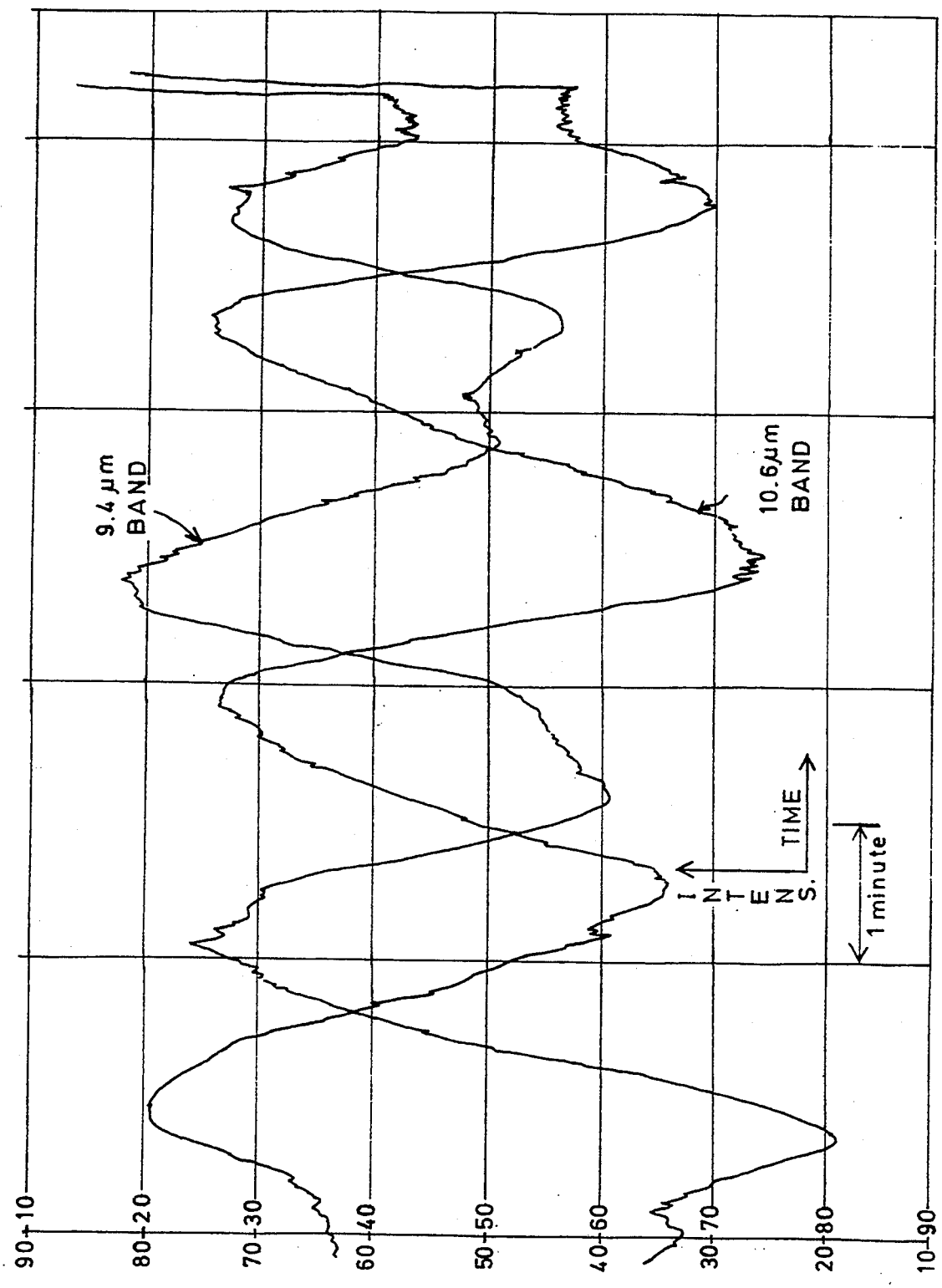

SLAB-WAVEGUIDE CO₂ LASER

TECHNICAL FIELD OF THE INVENTION

The present invention pertains to slab-waveguide $CO_2$ lasers.

BACKGROUND OF THE INVENTION

Many studies has been made in the prior art of various configurations of waveguide and slab-waveguide $CO_2$ lasers due to their compact size, high power per volume, and low manufacturing cost. A waveguide laser is different from a conventional laser because, in a waveguide laser, light does not follow the laws of free-space propagation over some (or all) of the propagation path inside a waveguide resonator structure, i.e., some structure within the laser acts to confine and guide the light. In more mathematical terms, one uses Fresnel number, defined as $a^2/(\lambda L)$, to characterize a waveguide resonator; where a is the half-width of an exposed mirror surface, $\lambda$ is the wavelength of light inside the resonator, and L is the resonator length. The Fresnel number measures the importance of diffraction effects and a low number indicates strong diffraction. A waveguide resonator has a Fresnel number on the order of unity or less and, as a result, spatial modes, frequency spectra, and losses are not adequately described by laws governing free-space resonators.

A slab-waveguide laser is different from a standard waveguide laser because a slab-waveguide laser does not confine propagation light fully, but does so in one dimension only. For example, consider a Cartesian coordinate system (x,y,z) with light propagating in the z-direction. A rectangular waveguide laser would confine light in the x- and the y-direction, whereas, a slab-waveguide laser would confine light in the x- or the y-direction (but not both), with the unconfined direction obeying normal free-space propagation theory.

Slab-waveguide lasers are disclosed in many U.S. patents, notably U.S. Pat. No. 4,719,639 (Tulip) issued Jan. 12, 1988; U.S. Pat. No. 4,939,738 (Opower) issued Jul. 3, 1990; and U.S. Pat. No. 5,048,048 (Nishimae) issued Sep. 10, 1991. The Tulip patent discloses an RF-excited slab-waveguide laser which uses a positive-branch unstable resonator for the unconfined direction and a stable waveguide resonator for the guided direction. The Opower patent discloses an RF-excited slab-waveguide laser which uses a positive-branch unstable resonator for the unconfined direction and which also uses astigmatism corrective optics, which astigmatism corrective optics are incorporated as part of the laser structure. Astigmatism is a by-product of the slab geometry (except in certain specially chosen resonator designs). As a result, astigmatism correction is usually required, although it need not be part of the laser housing. The Nishimae patent discloses a microwave-excited slab-waveguide laser which uses spherical mirrors to define a negative-branch unstable resonator in the unconfined direction. The negative-branch resonator exhibits an internal focus typically found within the active region of the laser which, if the intensities are high enough, causes loss of efficiency and possibly even optical breakdown of the gain medium. However, as is well-known in the art, negative-branch unstable resonators are much less alignment sensitive than their positive-branch counterparts. Further, as pointed out in the Nishimae patent, the slab-waveguide produces a line focus, not a point focus, within the medium; hence intensities are reduced somewhat. Therefore, depending on power levels and size of the device to be constructed, either positive-branch or negative-branch designs may prove optimal.

Refinements to the basic slab lasers disclosed in the above-identified patents have been disclosed in further U.S. patents, specifically: U.S. Pat. No. 5,123,028 (Hobart, et al.) issued Jun. 16 1992; U.S. Pat. No. 5,131,003 (Mefferd) issued Jul. 14 1992; U.S. Pat. No. 5,131,004 (Dallarosa, et al.) issued Jul. 14, 1992; U.S. Pat. No. 5,140,606 (Yarborough, et al.) issued Aug. 18, 1992; and U.S. Pat. No. 5,155,739 (Mefferd) issued Oct. 13, 1992. The Hobart et al. patent discloses the use of spherical mirrors in a negative-branch geometry, which spherical mirrors are placed a prescribed distance from the slabs so that the radius of curvature of light in the confined (waveguide) direction at the mirror surface approximately matches the radius of curvature of the mirror. The Mefferd '003 patent discloses the use of a support structure for electrodes that allows for thermal expansion during operation of the laser. The Dallarosa et al. patent discloses a method of pre-ionizing a $CO_2$ gas mixture to help stabilize the discharge, especially when the laser is run in a low duty-cycle pulsed mode. The Yarborough et al. patent discloses a mechanism for holding electrodes a required distance apart while minimizing constrictions on gas flow within the laser housing. Lastly, the Mefferd '739 patent discloses a mechanism for holding adjustable mirrors in a low-pressure, sealed-off environment.

Most slab-waveguide $CO_2$ lasers exhibit switching between rotational transitions of the $CO_2$ molecule that occur within a specific vibrational transition, which switching produces relatively small variations in wavelength. This switching between rotational transitions within a specific vibrational transition is common to most $CO_2$ lasers and has become known in the art as "line-hopping." For medical applications, the small variations in wavelength caused by line-hopping do not present a problem and can usually be ignored.

However, we have discovered a phenomenon which is unknown in the art. In particular, we have discovered that, unless special care is given to the design of both the slab-waveguide and the resonator optics, a slab-waveguide $CO_2$ laser is capable of emitting light over a wide range of wavelengths, which wavelengths arise from two different vibrational transitions of the $CO_2$ molecule. These wavelength regions are centered approximately at 10.6 $\mu$m and 9.4 $\mu$m, respectively. The transition producing 10.6 $\mu$m radiation has the highest gain of any transition of the $CO_2$ molecule and, therefore, nearly all conventional $CO_2$ lasers operate at 10.6 $\mu$m without the need to take precautions to avoid laser light from occurring at 9.4 $\mu$m. However, using slab geometries and standard broadband optics as described in the prior art, we have discovered that a slab-waveguide $CO_2$ laser can switch erratically from one vibrational transition to the other and back again.

The lack of understanding of this problem in the prior art occurs for two reasons: lack of continuous monitoring of the output beam and fortuitous waveguide suppression. Wavelength switching which occurs in lasers fabricated according to prior art teachings are understood from the following. FIG. 9 shows, in pictorial form, a configuration used to measure output power from conventional slab-waveguide laser 100 utilizing ZnSe beamsplitter 10. As shown in FIG. 9, output beam 110 from slab-waveguide laser 100 is split into reflected beam 120 and transmitted beam 130. Reflected beam 120 is detected by detector 11 and transmitted beam 130 is detected by detector 12, reflected beam 120 and transmitted beam 130 are monitored simultaneously. FIG. 9A shows a measured plot of ZnSe beamsplitter 10 characteristics. As seen from FIG. 9A, ZnSe beamsplitter 10 has an approximately 1% measured reflectivity at 10.6 $\mu$m and an approximately 4% measured reflectivity at 9.4 $\mu$m. This is to be contrasted with a variation due to line hopping which would produce a variation of about 10% in the transmitted and reflected signals.

FIG. 10 shows a plot of measured output power of conventional slab-waveguide $CO_2$ laser 100 vs. time taken simultaneously from detector 12 monitoring transmitted beam 130 and detector 11 monitoring reflected beam 120. As seen in FIG. 10, reflected beam 120 experiences very wide fluctuations in relative power, while transmitted beam 130 is very nearly constant, except for the ~10% fluctuation expected from normal "line-hopping."

FIG. 11 is a plot of measured output power of conventional slab-waveguide $CO_2$ laser 100 vs. time obtained using the configuration illustrated in FIG. 9. However, in generating FIG. 11, conventional slab-waveguide $CO_2$ laser 100 was run so as to mimic actual surgical use. That is, fifteen (15) laser bursts, each 45 seconds long and separated by two (2) minutes off-time, were recorded by a digital oscilloscope and the high-low envelope of the bursts is shown in FIG. 11. As can be seen in FIG. 11, in agreement with FIG. 10, the envelope of the reflected beam is much greater than that of the transmitted beam. This confirms that conventional slab-waveguide laser 100 switched wavelength over a wider range than could be accounted for by line-hopping and that the change in reflectivity of beamsplitter 10 for the different wavelengths caused wide fluctuations in reflected beam 120.

FIG. 12 shows, in pictorial form, a configuration used to confirm that the above-described wavelength fluctuations were due to switching between vibrational bands of the slab-waveguide $CO_2$ laser. As shown FIG. 12, output beam 110 from slab-waveguide laser 100 impinges upon ZnSe beamsplitter 10, which beamsplitter has a reflectivity of 10% at 10.6 $\mu$m and a reflectivity of 12% at 9.4 $\mu$m. Reflected beam 120 is spectrally separated by diffraction grating 140 (— order, near-Littrow) into spectral bands corresponding to the 10.6 $\mu$m band and the 9.4 $\mu$m band detected by detectors 150 and 160, respectively. FIG. 13 is a simultaneous plot of the 10.6 $\mu$m band and the 9.4 $\mu$m band in output beam 110 from detectors 150 and 160, respectively. As can be seen from FIG. 13, slab-waveguide laser 100 is periodically switching wavelengths. It can also be seen that the sum of both components is roughly constant, in agreement with the transmitted portions of the output beam presented in FIGS. 10 and 11.

Two facts become clear from the above. First, wavelength in the output beam of a conventional slab-waveguide $CO_2$ laser changes dramatically over time and, second, total laser output remains nearly constant over time. Thus, since prior art apparatus typically do not continuously monitor the laser output beam, wavelength switching has gone unnoticed. A further reason that wavelength switching has not been detected in the prior art is that it is possible, as a fortuitous matter, to choose a waveguide design that helps suppress one of the wavelength regions. However, even though this is possible, we have discovered that the selectivity of a waveguide itself is generally quite low i.e., the losses are comparable for 9.4 $\mu$m and 10.6 $\mu$m. For that reason, we have discovered that one cannot depend on the selectivity of a waveguide structure alone to reliably suppress unwanted wavelength switching.

The large wavelength shift produced by changing vibrational transitions causes a problem for $CO_2$ lasers used in medicine due to the high water absorption of the $CO_2$ wavelength. Since the primary constituent of most tissue is water, this absorption means that $CO_2$ laser energy is applied efficiently and, equally as important, locally to target tissue. The measure of locality of a laser-tissue interaction depends on the size of the focused beam and the penetration depth of the beam, which penetration depth is governed mainly by the water absorption coefficient. Referring to tabulated values of absorption coefficients for water (for example, "Infrared Optical properties of Water and Ice Spheres", W. M. Irvine and J. B. Pollack, Icarus 8, [1968], p. 324), the absorption coefficient is 720 cm−1 at 10.5 $\mu$m and drops to 410 cm−1 at 9.5 $\mu$m. Although exact values are not tabulated, the coefficients vary smoothly with wavelength and the values at 10.5 $\mu$m and 9.5 $\mu$m are quite close to those at 10.6 $\mu$m and 9.4 $\mu$m. Therefore, the characteristic penetration depth (defined as the point where laser intensity is ~63% of its initial value) is ~13.9 $\mu$m at 10.6 $\mu$m and it increases to ~24.4 $\mu$m at 9.4 $\mu$m; a 76% variation. As a result, for consistent treatment results, especially in delicate surgery, it is imperative to keep the laser operating within a given vibrational transition.

In light of the above, we have discovered that there is a need to prevent switching between vibrational transitions in a slab-waveguide $CO_2$ laser and, as a result, there is a need in the art for a slab-waveguide $CO_2$ laser that is stable and that operates within a given vibrational transition of the $CO_2$ molecule.

SUMMARY OF THE INVENTION

Advantageously, an embodiment of the present invention is an improved slab-waveguide $CO_2$ laser that is stable and that operates within a given vibrational transition of the $CO_2$ molecule.

In particular, an embodiment of the present invention is a slab-waveguide $CO_2$ laser comprising spaced-apart, slab electrodes, whose surfaces excite a laser gas and guide laser light, and a resonator formed around the slab electrodes, the resonator being an unstable waveguide resonator in a direction parallel to faces of the slab electrodes and being a stable waveguide resonator in a direction perpendicular to the slab electrodes and employing at least one wavelength selective optic within the resonator to suppress laser oscillations at a particular wavelength or wavelength band.

BRIEF DESCRIPTION OF THE FIGURE

FIG. 9A shows a measured plot of ZnSe beamsplitter characteristics;

FIG. 13 is a simultaneous plot of the 10.6 $\mu m$ band and the 9.4 $\mu m$ band in laser light output from a conventional slab-waveguide $CO_2$ laser.

DETAILED DESCRIPTION

Figure 1A:
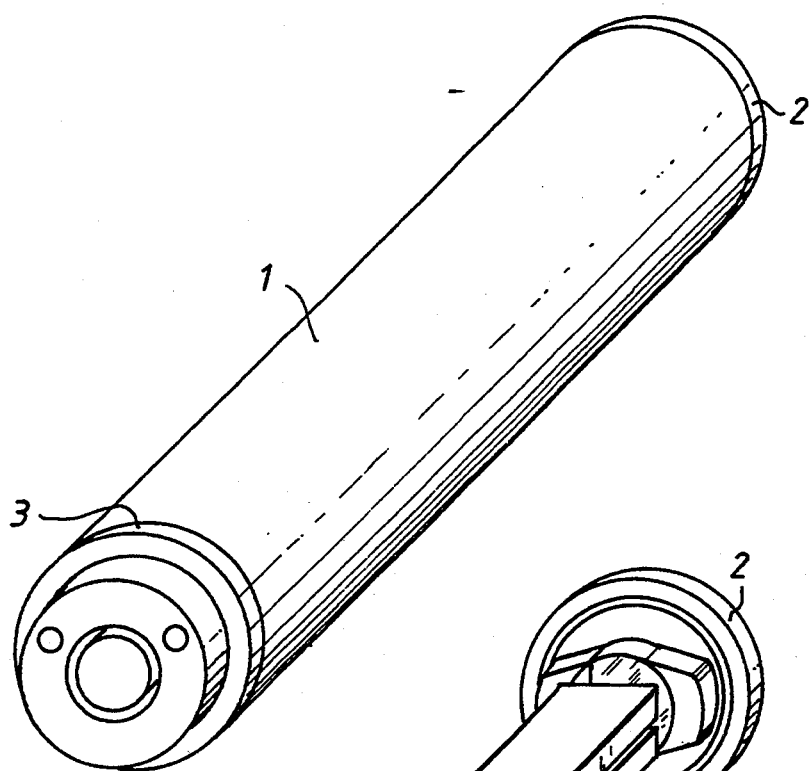
FIG. 1A–C shows perspective drawings of various stages of assembly of a slab-waveguide $CO_2$ laser (Not shown for clarity are well known apparatus which hold slabs apart, copper tubes which supply cooling water to the slabs, and inductive coils which help match the laser to an RF power source for optimal power transfer to a gas plasma)
Figure 1B:
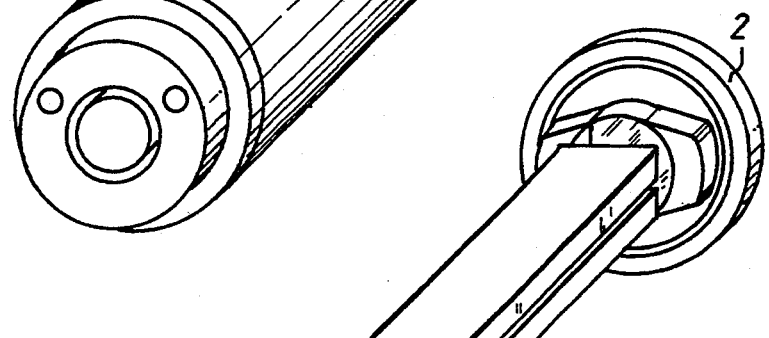
Figure 1C:
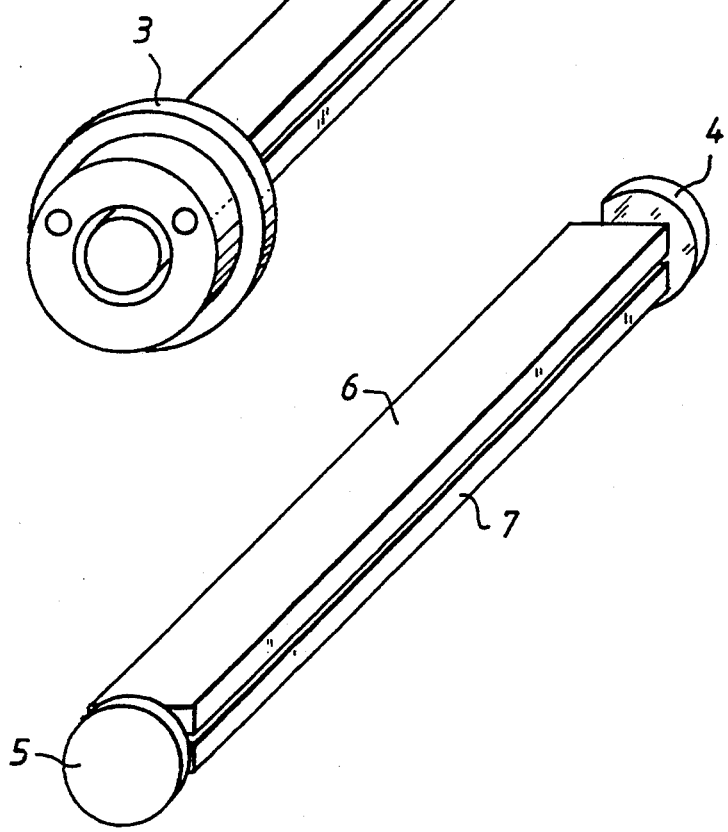
Figure 3:
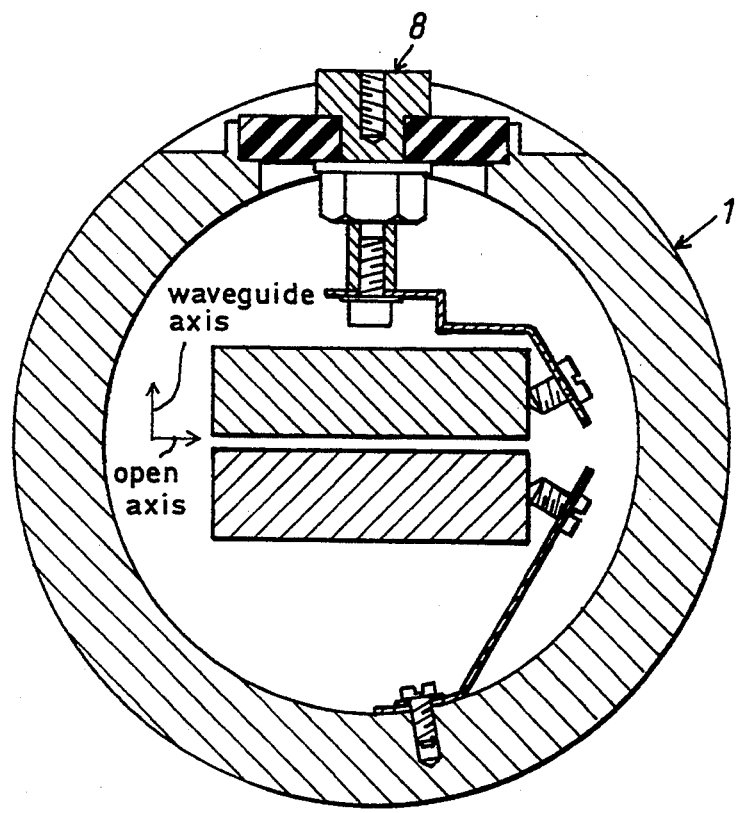
FIG. 3 is a simplified cross-section of a laser tube wherein waveguide (confined) and open (unconfined) axes are indicated—the unconfined direction is also the unstable resonator axis.
Figure 4:
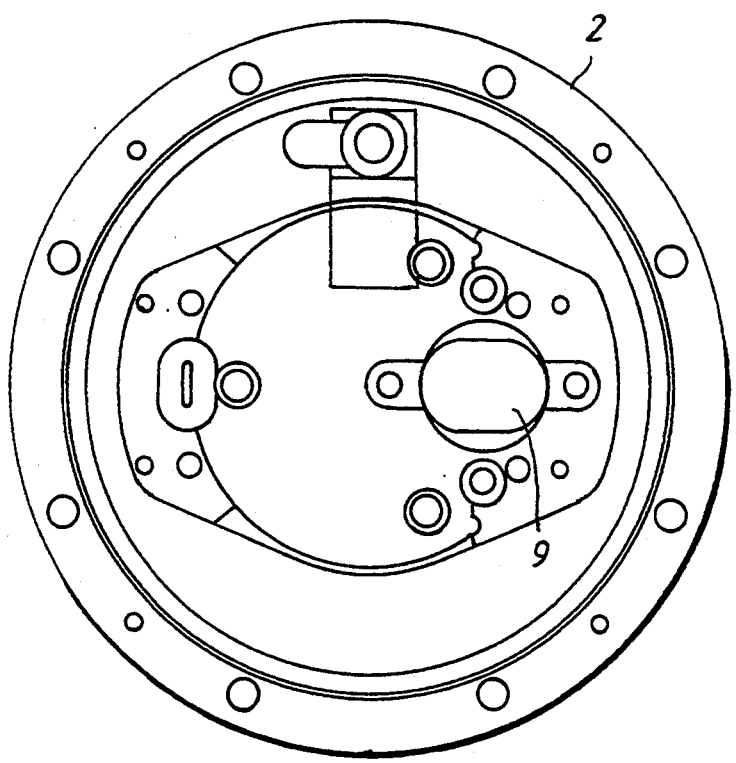
FIG. 4 shows a front mirror mount.
Figure 5B:
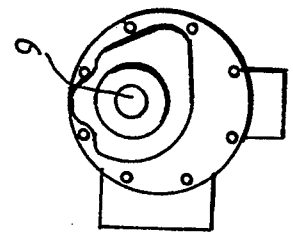
FIG. 5A–D shows a cross section view and a top view of the assembled slab-waveguide laser whose parts are illustrated in FIGS. 1–4.
Figure 5A:
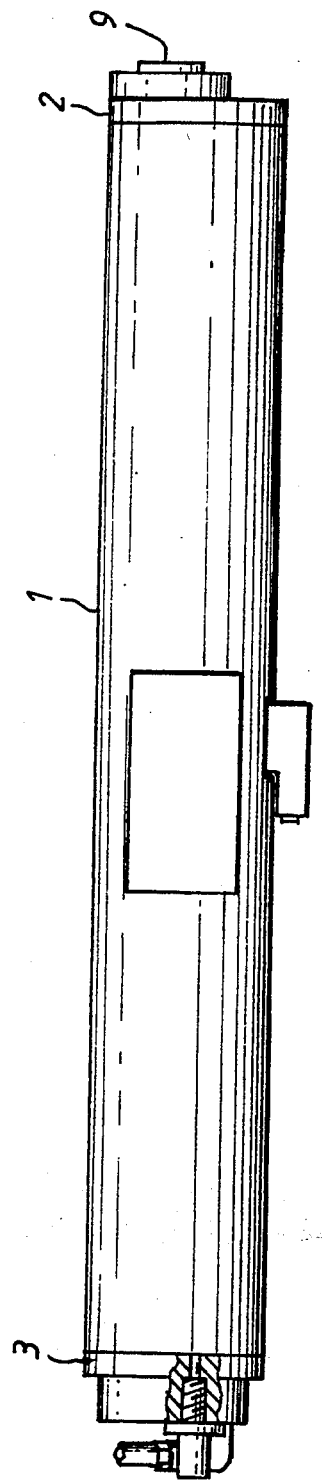
Figure 5D:
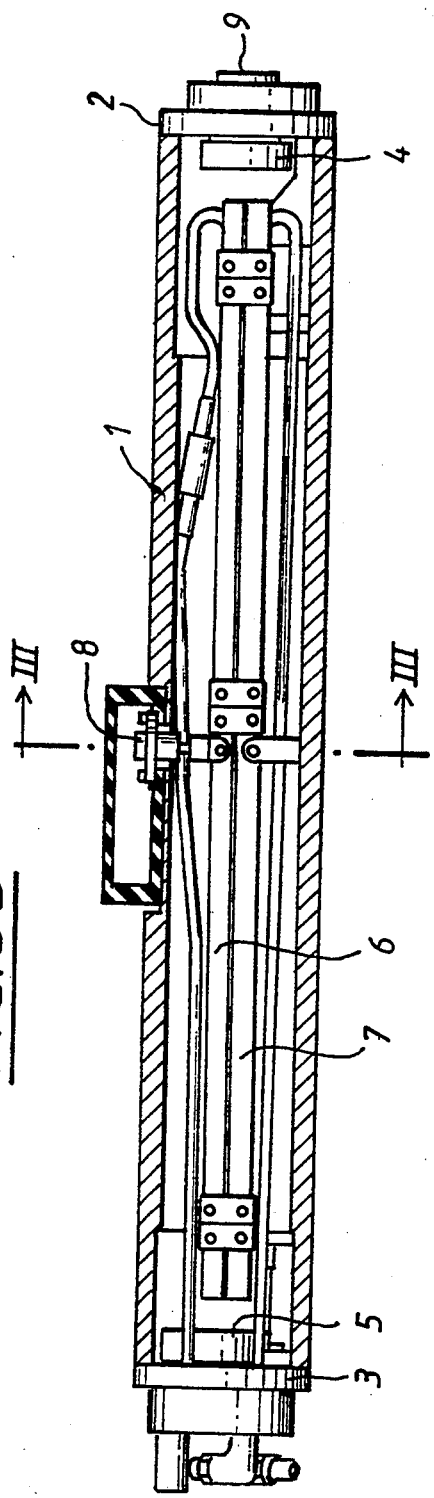
Figure 5C:
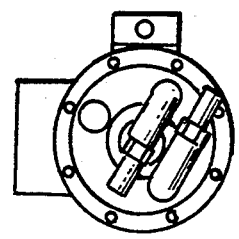

FIG. 1 shows perspective drawings of various stages of assembly of a slab-waveguide $CO_2$ laser (Not shown for clarity in FIG. 1 are well known apparatus which hold slab electrodes apart, copper tubes which supply cooling water to the slab electrodes, and inductive coils which help match the laser to an RF power source for optimal power transfer to a gas plasma). As shown in FIG. 1, the major parts of the slab-waveguide $CO_2$ laser are cylindrical housing 1, end-flanges 2 and 3 which also hold mirrors 4 and 5 and which are sealed to cylindrical housing 1 to produce a vacuum-tight seal, and slab electrodes 6 and 7. It should be noted that front mirror 4 has a section removed to allow light out of the laser through vacuum-window 9 shown in FIG. 4. FIG. 3 is a simplified cross-section of the laser tube wherein waveguide (confined) and open (unconfined) axes are indicated by arrows—the unconfined direction is also the unstable resonator axis. The preferred spacing between slab electrodes 6 and 7 is ~2 mm.

Slab electrodes 6 and 7 are held apart by simple ceramic spacers and are supported within the structure by simple mechanical means to hold them fixed with respect to mirrors 4 and 5. Slab electrodes 6 and 7 excite the laser gas and confine the laser light in one dimension. In the preferred embodiment, slab electrodes 6 and 7 are either 4×60 cm in size for a high power laser or 2×15 cm in size for a low power version. Further, in the preferred embodiment, slab electrodes 6 and 7 are made of aluminum but, as is well known in the art, they can also be fabricated from other materials such as copper, stainless steel and so forth.

Figure 2:
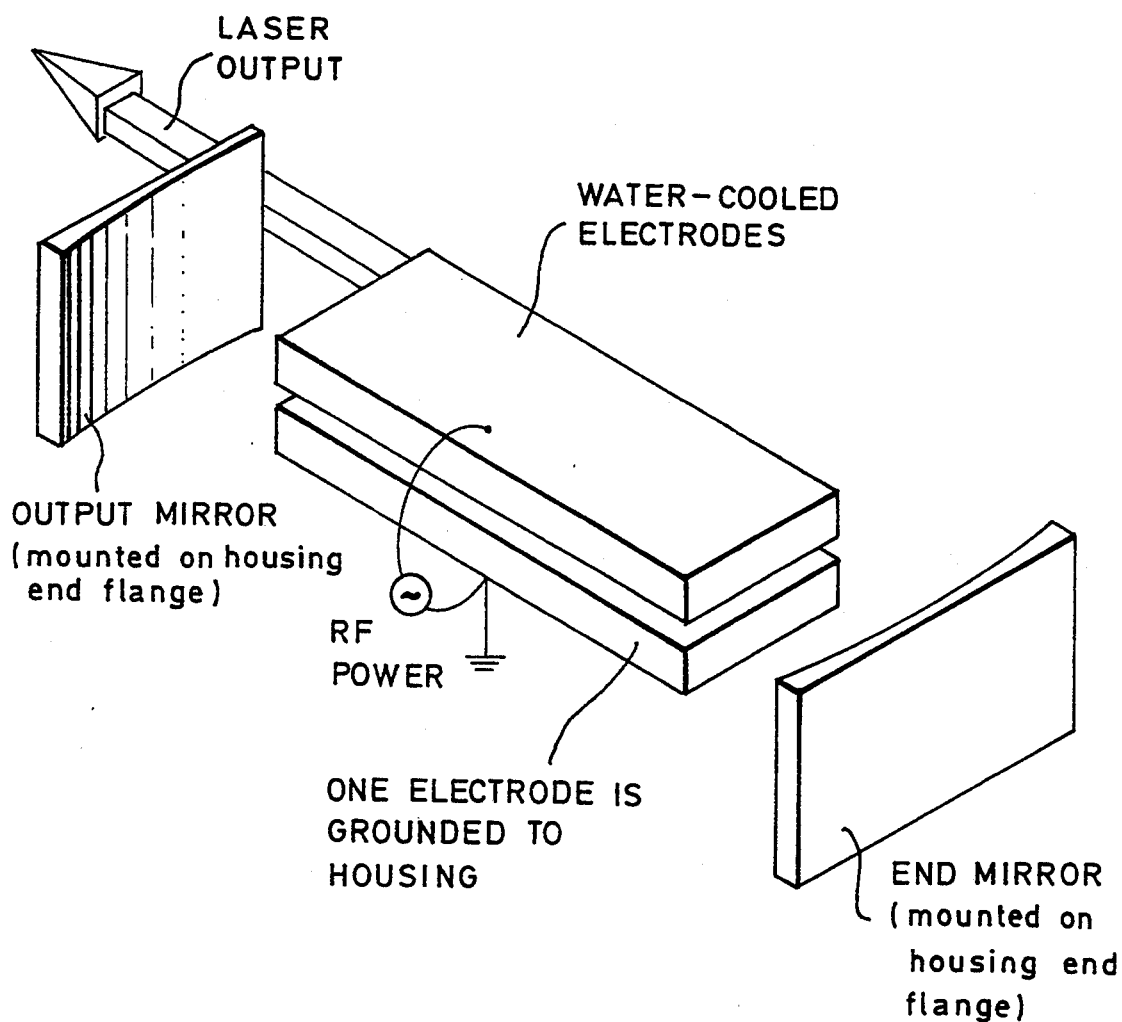
FIG. 2 is a pictorial representation of a slab-waveguide $CO_2$ laser illustrating the slab electrodes and the nature of the emitted laser light.

As is well known in the art, the slab-waveguide $CO_2$ laser is filled with gas in a standard 4:2:1 mix of helium:nitrogen:carbon dioxide plus 4% xenon and the gas is pressurized to between 100 and 150 mbar. As is well known in the art, the gas is excited by RF coupling to a standard, solid state RF generator, running at 70 MHz. As shown in FIG. 3, RF coupling is provided by well known structure 8 through a vacuum-tight opening in cylindrical housing 1 (structure 8 is typically affixed to electrode 6 by a screw through the hole in structure 8). The RF generator shown in FIG. 2 is "matched" to the slab-waveguide laser using a suitable impedance transformation network (not shown). In the preferred embodiment, slab electrode 7 is held to ground potential by direct connection to cylindrical housing 1, while slab electrode 6 is directly connected to the RF supply through the impedance transformation network.

The slab-waveguide laser must be water-cooled to provide high power for sustained operation. To do this, as is well known in the art, cooling pipes are introduced into the waveguide housing through holes in end-flanges 2 and 3 or through holes in cylindrical housing 1. However, in either case, the holes are sealed to maintain vacuum integrity of the structure. The cooling tubes are press-fit into mating channels formed along the side of the electrodes away from the gas plasma for good thermal contact. Owing to the tightness of the press-fit, soldering/brazing is not required. These tubes appear in FIG. 5 which shows a cross section view and a top view of the assembled slab-waveguide laser whose parts are illustrated in FIGS. 1–4.

The component of light parallel to the electrode faces is acted on only by mirrors 4 and 5 which are designed and configured to produce a confocal, unstable resonator which may be either negative-branch or positive-branch. As is well known in the art, a stable resonator is formed in a direction perpendicular to the faces of slab electrodes 6 and 7 and the design of this stable resonator is chosen to help maximize laser performance at the desired wavelength. As is also well known in the art, mirrors 4 and 5 are spaced far enough away from the ends of slabs 6 and 7 so that the reflecting surfaces of the mirrors are not damaged by an RF-excited gas plasma formed when RF energy is applied through the matching network and structure 8 to slab electrodes 6 and 7. The damage is done because the plasma consists of positively charged gas ions which are very reactive and would chemically alter the mirror surface if allowed to contact the surface. The mirrors are supported in end flanges 2 and 3. The spacing is also determined so that coupling losses of light back into the slab-waveguide are minimized, this determination is done experimentally. However, it has been shown by previous calculations ("Coupling Losses in Hollow Waveguide Laser Resonators", R. L. Abrams, *IEEE Journal of Quantum Elec.*, QE-8, 1972 p.838 and "Resonator Theory for Hollow Waveguide Lasers", R. L. Abrams and A. N. Chester, *Applied Optics*, 13, 1974, p.2117), and also by our own experiments, that these coupling losses, within a fairly large range, are relatively insensitive to the precise distance of mirrors 4 and 5 from the ends of the waveguide. Therefore, it is not strictly required that the mirror surfaces be positioned so that the radius of curvature of the light beam emerging from the waveguide and the radius of curvature of the mirrors be equivalent to achieve satisfactory laser performance as was believed to be true in prior art. In addition, mirrors 4 and 5 are spaced close enough to the electrodes so that the overall laser remains compact. In order to satisfy these constraints, mirrors 4 and 5 are placed between 2.0 and 4.0 cm from the end of slab electrodes 6 and 7. Note that this spacing is independent of the unstable resonator design.

Mirrors 4 and 5 may be fabricated by a variety of methods, and may be either cylindrically ground or spherically ground. If they are cylindrically ground, the long axis of the cylinder must be aligned parallel to the waveguide axis shown in FIG. 3 so that the curved surface is along the open plane.

As is well known in the art, the radius of curvature of mirrors 4 and 5 is dictated by the resonator design. In the preferred embodiment of the present invention, we use a confocal, unstable, negative-branch design and having a resonator length, i.e., the electrode length plus the mirror spacings, and an output coupling to maximize laser power (Of course, those skilled in the art understand that the present invention also applies to positive-branch designs as well). The design equations for these conditions are well-known and have been present in the literature for many years. The only parameter which must be experimentally verified is the optimum output coupling, which in our case has been determined to be 19%. However, this value of optimum output coupling varies from configuration to configuration and values for different systems could vary substantially.

As shown in FIG. 1, front mirror 4 is cut to expose 19% of the width of slabs 6 and 7 to allow 19% of the light to escape from the resonator. Mirrors 4 and 5 are aligned with respect to one another to provide maximum power.

In the prior art, both mirrors 4 and 5 are fabricated from either copper or silicon substrates. We have discovered that both of these materials are highly reflective at both 9.4 $\mu$m and 10.6 $\mu$m. As a result, as we have discovered, it is not possible for mirrors of these substrates to prevent laser oscillations at unwanted wavelengths from occurring, even with selective coatings. Therefore, in accordance with the present invention, either one or both of mirrors 4 and 5 is fabricated from a substrate which is transmissive at an unwanted one of the two wavelength regions.

In further accordance with the present invention, one or both of mirrors 4 and 5 must also reflect the desired wavelength with as high a reflectivity as possible. In practical lasers systems this condition means the reflectivity should exceed 98%, and preferably be above 99%.

In alternate embodiments of the present invention, wavelength selective optics such as transmissive or reflective diffraction gratings, prisms, birefringent plates, and so forth may be disposed within the laser resonator to provide the properties identified above with respect to the resonator mirrors. Since additional components such as wavelength selective optics complicate overall laser design it is preferred to accomplish wavelength selectivity directly using appropriate mirrors.

U.S. Pat. No. 5,148,438 (Remo and Schaefer) issued Sep. 15, 1992, discloses a slab-waveguide $CO_2$ laser that uses transmissive mirrors in a stable resonator geometry. Such mirrors are generally made from ZnSe compounds and are selectively coated. However, as disclosed, the reflectivity of the transmissive front mirror is relatively low (i.e. ~80%), since the output light goes through the mirror, rather than around the edge as is the case for an unstable resonator design. Thus, although the Remo and Schaefer disclose the use of selectively coated mirrors for use in a stable resonator design, it is not possible to coat such substrates for use in an unstable geometry since the coatings cannot produce the very high reflectivities (>99% typical) needed for efficient operation of the unstable resonator design. In addition, the use of transmissive optics in the disclosed design is required by use of the stable resonator, not for reason of wavelength switching which was unnoticed.

Since selective mirrors are more expensive than the standard mirrors discussed above, it is preferred to use only one selective mirror and one standard mirror to suppress a given wavelength. Since the gain/loss ratio for both wavelengths in the slab-waveguide $CO_2$ laser is roughly equal, the requirements for the mirrors are given as follows:

$$R_1 R_2 \geq R_{lase} \text{ for } \lambda = 10.6 \ \mu m \text{ and}$$

$$R_1 R_2 \leq R_{threshold} \text{ for } \lambda = 9.4 \ \mu m$$

where: $R_1$ is the reflectivity of front mirror 4, $R_2$ is the reflectivity of rear mirror 5, $R_{lase}$ is the minimum combined reflectivity needed for efficient laser operation (1.0 is ideal), and $R_{threshold}$ is the minimum reflectivity for which lasing can occur. The above equations are for the case when 9.4 $\mu$m radiation is to be suppressed. In order to suppress 10.6 $\mu$m radiation, the two conditions are interchanged. For example, if the front mirror has a reflectivity close to 1 for both wavelengths, then the requirement on the rear (selective) mirror is that it have a reflectivity at the desired wavelength above Rlase (>99% typical) and below $R_{threshold}$ (<70% typical). If this can be achieved, only one selective mirror is needed, otherwise two selective mirrors need to be used.

In the preferred embodiment of the present invention, silicon is used as the front mirror substrate and germanium (which is transparent at 9.4 $\mu$m) is used for the rear mirror. The rear mirror is coated so that R is above 0.99 at 10.6 $\mu$m and below 0.70 at 9.4 $\mu$m.

Figure 6:
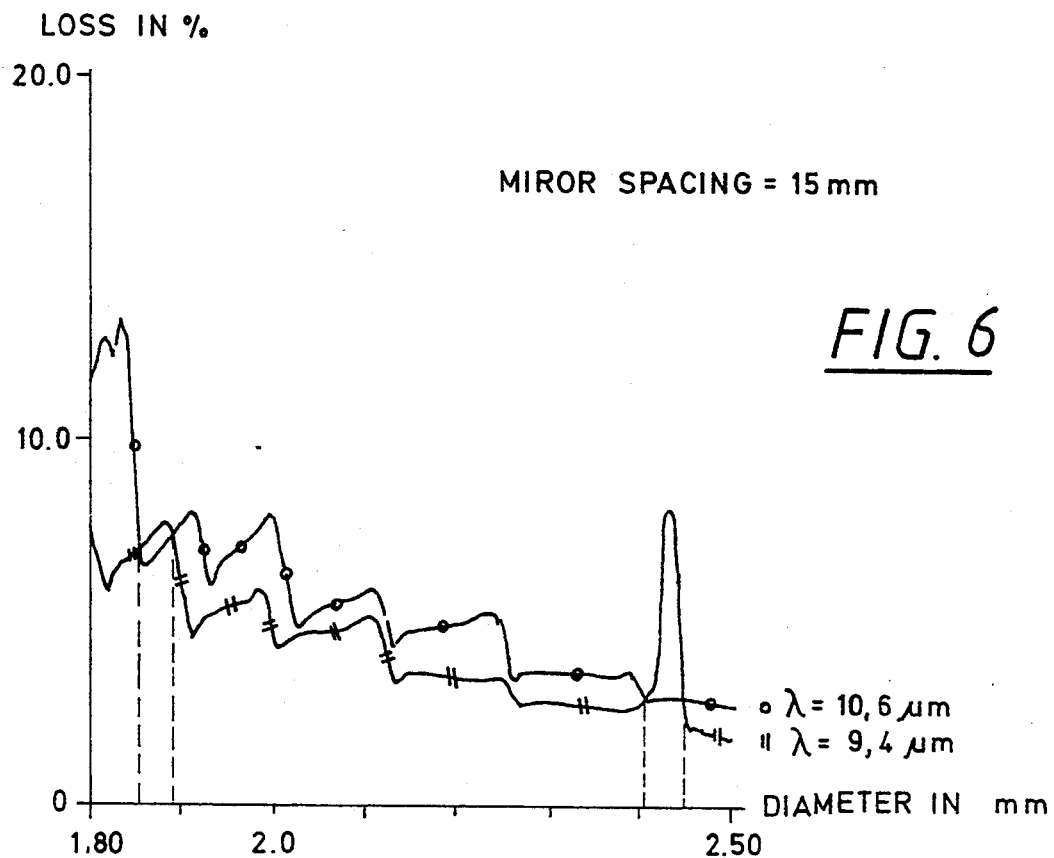
FIG. 6 is a plot of calculated waveguide losses versus size of an aluminum waveguide (for this case, mirrors are placed 15 mm from the ends of the waveguides) wherein dashed regions indicate dimensions that provide lower internal losses at 10.6 $\mu m$ as compared to 9.4 $\mu m$.
Figure 7:
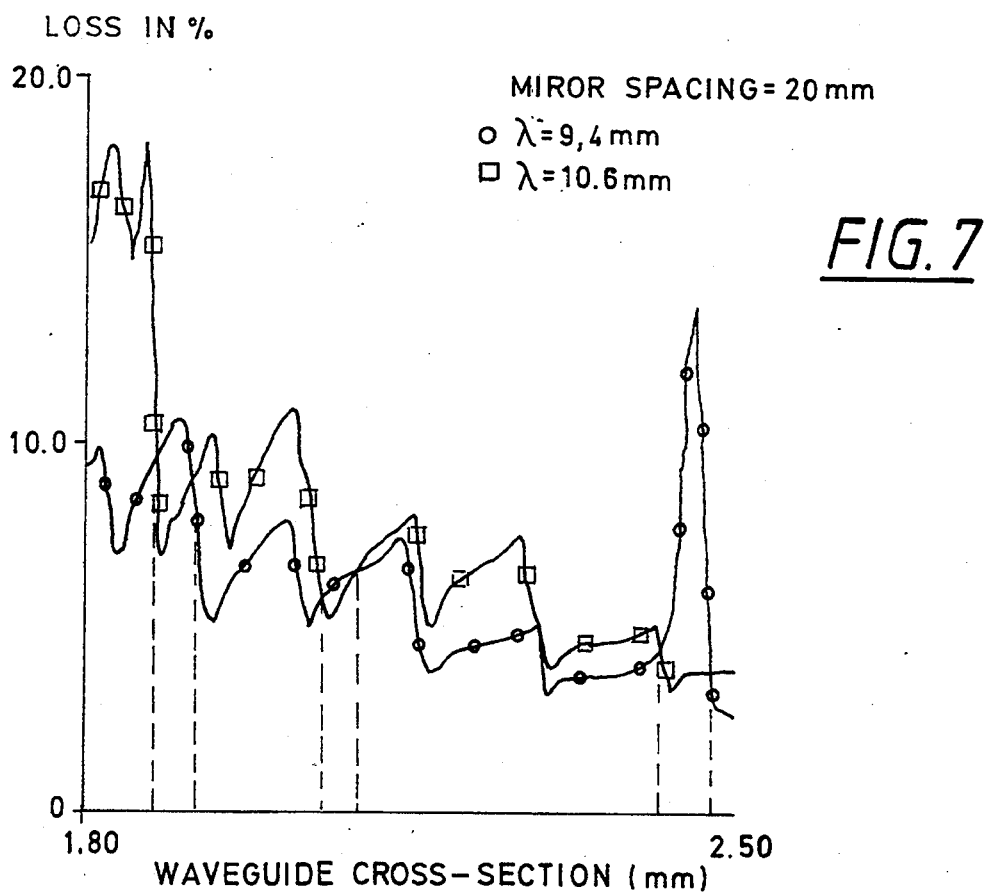
FIG. 7 is a plot of calculated waveguide losses versus size of an aluminum waveguide (for this case, mirrors are placed 20 mm from the ends of the waveguides) wherein dashed regions indicate dimensions that provide lower internal losses at 10.6 $\mu m$ as compared to 9.4 $\mu m$.
Figure 8:
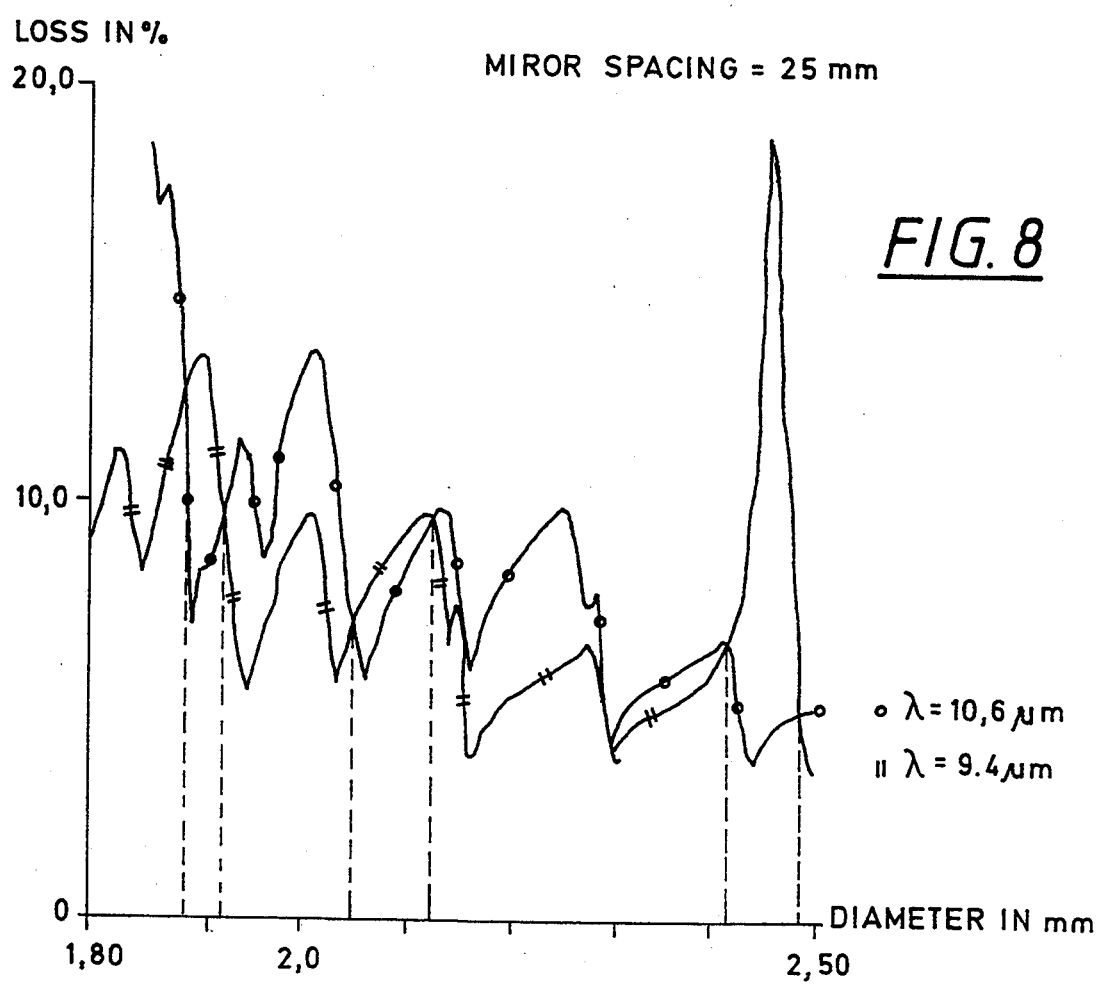
FIG. 8 is a plot of calculated waveguide losses versus size of an aluminum waveguide (for this case, mirrors are placed 25 mm from the ends of the waveguides) wherein dashed regions indicate dimensions that provide lower internal losses at 10.64 $\mu m$ as compared to 9.4 $\mu m$.

In order to fabricate an improved slab-waveguide $CO_2$ laser in accordance with the present invention, a conventional slab-waveguide laser was disassembled and a wavelength-selective Ge rear mirror was used in place of the conventional Si rear mirror. To further enhance the operation of the improved laser, the waveguide dimensions were chosen such that the predicted losses for the 10.6 $\mu$m band were lower than those for the 9.4 $\mu$m band. The calculated possible waveguide dimensions (i.e. spacing between slab electrodes) that provide this condition for aluminum electrodes are shown in FIGS. 6–8 as the regions between the dashed vertical lines. It was determined that a waveguide cross-section of between 1.9 mm and 2.1 mm was optimal for a mirror spacing of 20 mm, see FIG. 7). Although the dimension region near 2.5 mm in the FIG. 7 shows greater selectivity (larger difference in relative losses) and slightly lower overall losses, the laser ran better at ~2 mm due to diffusion cooling of the laser gas by the slab electrodes.

Figure 9:
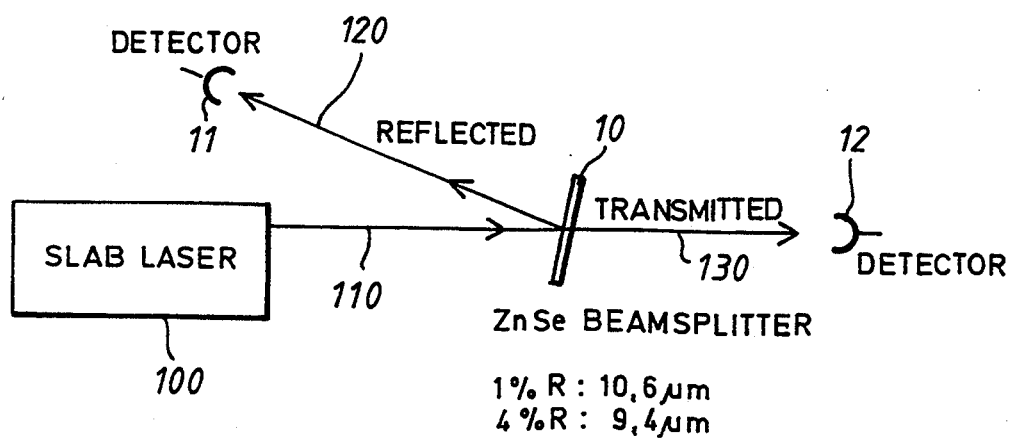
FIG. 9 shows, in pictorial form, an apparatus used to obtain data presented in FIGS. 10, 11, and 14.
Figure 10:
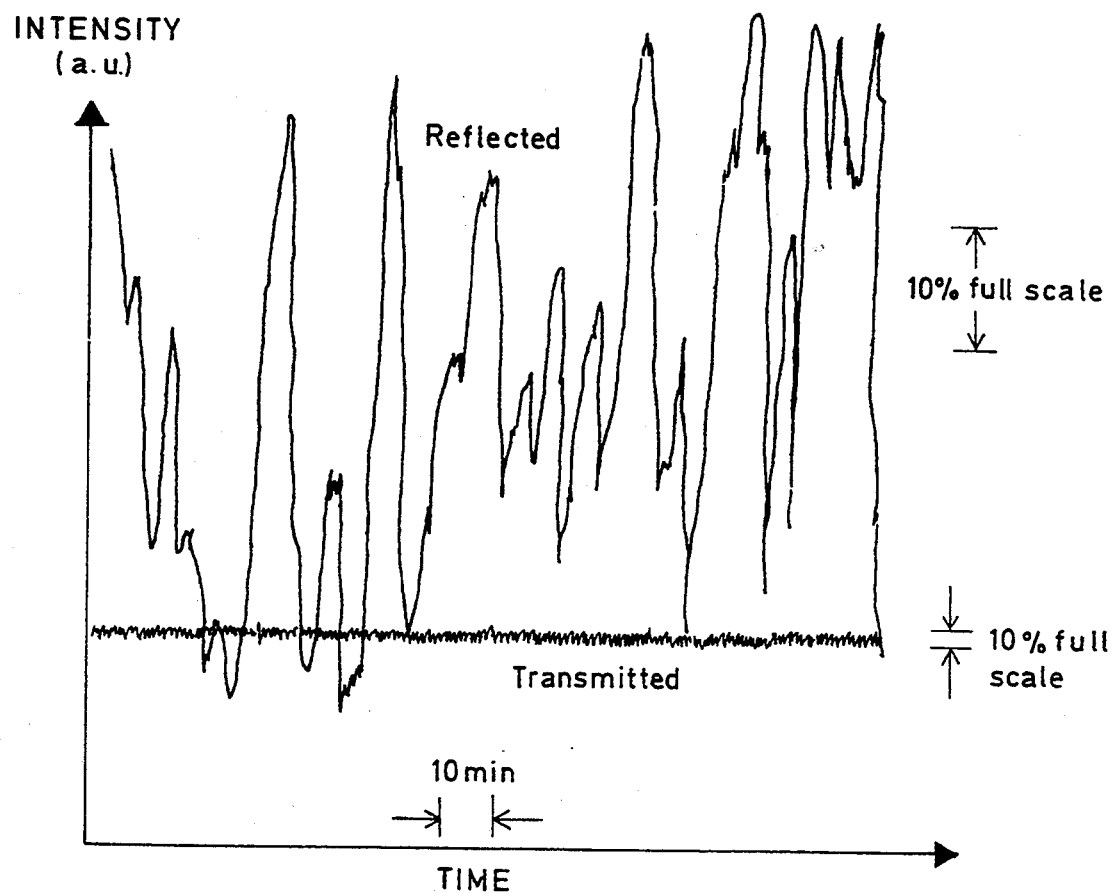
FIG. 10 is plot of measured output power of a conventional slab-waveguide $CO_2$ laser vs. time taken simultaneously from a detector directly monitoring a beam transmitted by, and a detector monitoring a beam reflected by, a beamsplitter.
Figure 11:
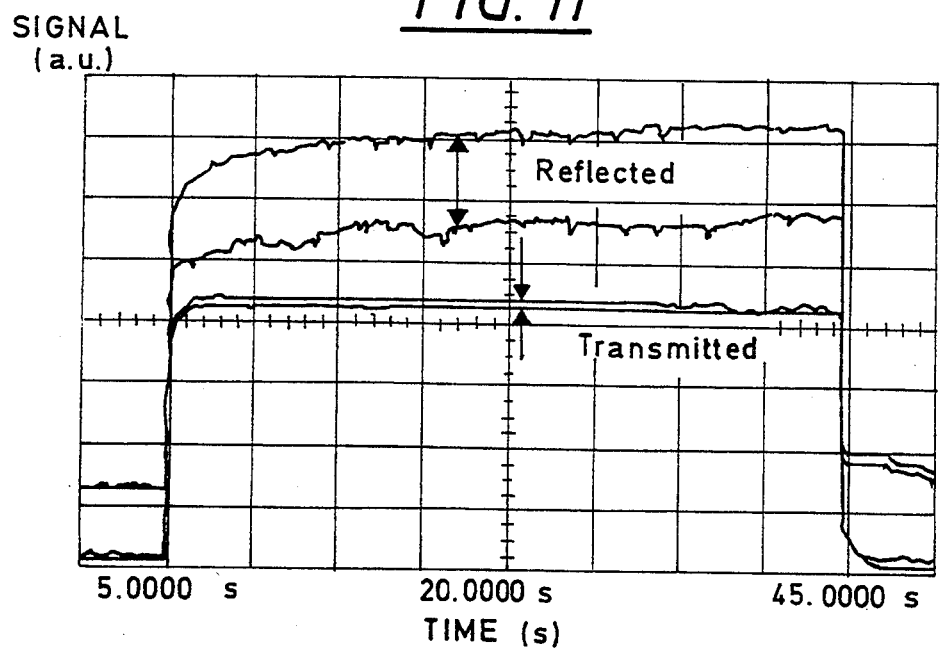
FIG. 11 is a plot of measured output power of a conventional slab-waveguide $CO_2$ laser vs. time taken simultaneously from a detector directly monitoring a beam transmitted by, and a detector monitoring a beam reflected by, a beamsplitter (fifteen separate 45 second long bursts of the laser were recorded and the high-low envelopes of the bursts are shown)
Figure 12:
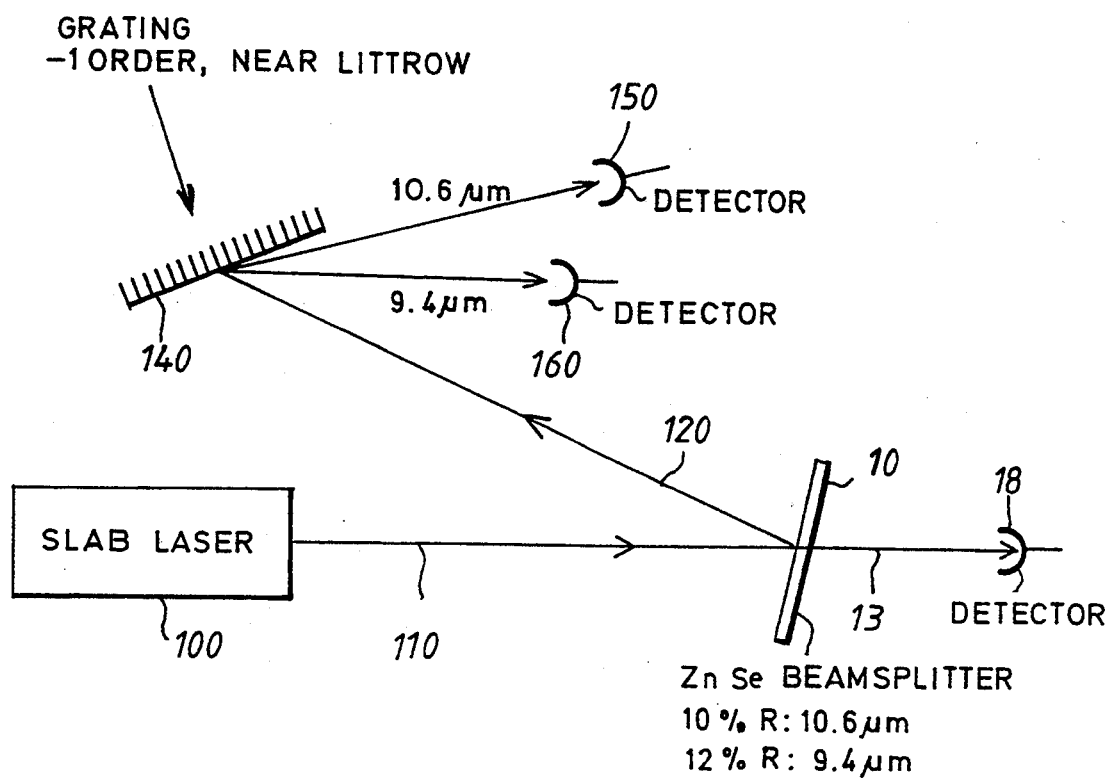
FIG. 12 shows, in pictorial form, an apparatus used to obtain data presented in FIG. 13.
Figure 14:
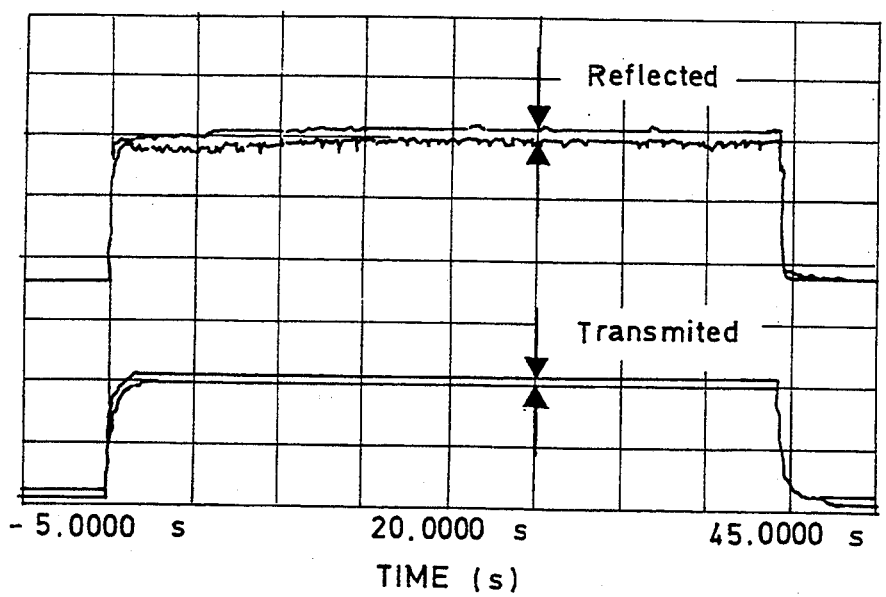
FIG. 14 is plot, similar to that of FIG. 11, but which was made using an improved slab-waveguide laser fabricated in accordance with the present invention.

The improved laser was then placed in the same configuration shown in FIG. 9, and fifteen laser bursts were recorded as was described in the Background of the Invention with respect to producing FIG. 11. FIG. 14 is plot, similar to that of FIG. 11, but which was made using an improved slab-waveguide laser fabricated in accordance with the present invention, i.e., having wavelength selective optics. As can be seen in FIG. 14, the reflected and transmitted envelopes are comparable. In addition, further monitoring of the output from the improved slab-waveguide laser using apparatus shown in FIG. 12 and described in the Background of the Invention, confirmed that the laser was steady within the 10.6 μm band.

Those skilled in the art will recognize that the foregoing description has been presented for the sake of illustration and description only. As such, it is not intended to be exhaustive or to limit the invention to the precise form disclosed. For example, modifications and variations are possible in light of the above teaching which are also within the spirit of the present invention.

What is claimed is:

1. A slab-waveguide laser comprising spaced-apart, slab electrodes, whose surfaces excite a $CO_2$ laser gas and guide laser light, and a resonator formed around the slab electrodes the resonator including a first mirror means and a second mirror means, the resonator being an unstable waveguide resonator in a direction substantially parallel to faces of the slab electrodes and being a stable waveguide resonator in a direction substantially perpendicular to the slab electrodes wherein the $CO_2$ laser gas has a first band and a second band, and wherein the resonator suppresses laser oscillations substantially at the second band and wherein the first mirror means has an effective reflectivity $R_1$ and the second mirror means has an effective reflectivity $R_2$ wherein:

$R_1R_2[>] \geq R_{lase}$ for wavelengths substantially in the first band and $R_1R_2[<] \leq R_{threshold}$ for wavelengths substantially in the second band where: $R_{lase}$ is a minimum combined effective reflectivity needed for laser operation, and $R_{threshold}$ is a minimum effective reflectivity for which lasing can occur.

2. The slab-waveguide laser of claim 1 wherein at least one of the first and second mirror means comprises a mirrr coating applied upon a germanium substrate.

3. The slab-waveguide laser of claim 1 wherein at least one of the first and second mirror means comprises a diffraction grating.

4. The slab-waveguide laser of claim 1 wherein at least one of the first and second mirror means comprises a prism.

5. The slab-waveguide laser of claim 1 wherein at least one of the first and second mirror means comprises a birefringent plate.

6. The slab-waveguide laser of claim 1 wherein at least one of the first and second mirror means is substantially transmissive substantially at the second band.

7. The slab-waveguide laser of claim 1 wherein the wavelength of the first band is substantially equal to 10.6 mm and the wavelength of the second band is substantially equal to 9.4 mm.

8. The slab-waveguide laser of claim 1 wherein the wavelength of the first band is substantially equal to 9.4 mm and the wavelength of the second band is substantially equal to 10.6 mm.

9. The slab-waveguide laser of claim 6 wherein the first mirror means is a front mirror and is comprised of a silicon substrate and the second mirror means is a rear mirror and is comprised of a germanium substrate coated so that its reflectivity is below about 0.70 at about the second band.

* * * * *